(12) United States Patent
Pyzik et al.

(10) Patent No.: US 8,186,565 B1
(45) Date of Patent: May 29, 2012

(54) METHOD OF BONDING ALUMINUM-BORON-CARBON COMPOSITES

(75) Inventors: Aleksander J. Pyzik, Midland, MI (US); Robert A. Newman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1259 days.

(21) Appl. No.: 11/873,837

(22) Filed: Oct. 17, 2007

Related U.S. Application Data

(60) Provisional application No. 60/852,500, filed on Oct. 18, 2006.

(51) Int. Cl.
*B23K 1/06* (2006.01)
*B23K 31/02* (2006.01)

(52) U.S. Cl. .................. 228/110.1; 228/121; 228/122.1; 228/248.1

(58) Field of Classification Search .................. None
See application file for complete search history.

(56) References Cited

U.S. PATENT DOCUMENTS

| | | | | |
|---|---|---|---|---|
| 3,459,515 A * | 8/1969 | Bergmann | ...................... | 75/238 |
| 4,469,757 A | 9/1984 | Ghosh et al. | | |
| 4,605,440 A * | 8/1986 | Halverson et al. | .............. | 75/238 |
| 4,702,770 A | 10/1987 | Pyzik et al. | | |
| 4,718,941 A * | 1/1988 | Halverson et al. | .............. | 75/236 |
| 4,834,938 A | 5/1989 | Pyzik et al. | | |
| 4,968,348 A * | 11/1990 | Abkowitz et al. | ............... | 75/244 |
| 5,011,063 A | 4/1991 | Claar | | |
| 5,409,589 A * | 4/1995 | Sekhar | .......................... | 204/279 |
| 5,425,494 A * | 6/1995 | Rosenthal et al. | .......... | 228/124.5 |
| 5,478,634 A * | 12/1995 | Setoyama et al. | ............. | 428/216 |
| 5,503,912 A * | 4/1996 | Setoyama et al. | ............. | 428/216 |
| 5,521,016 A * | 5/1996 | Pyzik et al. | .................... | 428/568 |
| 5,672,435 A * | 9/1997 | Born et al. | ................. | 428/539.5 |
| 5,780,164 A * | 7/1998 | Pyzik et al. | ................. | 428/539.5 |
| 5,799,238 A * | 8/1998 | Fisher et al. | ....................... | 419/7 |
| 5,820,965 A * | 10/1998 | Pyzik et al. | ................. | 428/846.2 |
| 5,930,581 A * | 7/1999 | Born et al. | .......................... | 419/5 |
| 6,042,627 A * | 3/2000 | Pyzik et al. | ...................... | 51/309 |
| 6,123,797 A | 9/2000 | Pyzik et al. | | |
| 6,200,526 B1 | 3/2001 | Fox et al. | | |
| 6,296,045 B1 | 10/2001 | Fox et al. | | |
| 6,835,349 B2 | 12/2004 | Pyzik et al. | | |
| 7,226,669 B2 * | 6/2007 | Benedictus et al. | ........... | 428/654 |
| 2009/0114083 A1 * | 5/2009 | Moore et al. | .................. | 89/36.02 |
| 2010/0021334 A1 * | 1/2010 | Funaki et al. | .................... | 419/12 |
| 2010/0055491 A1 * | 3/2010 | Vecchio et al. | ............... | 428/603 |

FOREIGN PATENT DOCUMENTS

EP  1134205  9/2001

* cited by examiner

*Primary Examiner* — Kiley Stoner

(57) ABSTRACT

An aluminum-boron-carbon (ABC) ceramic-metal composite bonded to a metal or metal-ceramic composite other than ABC composite is made by forming a porous body comprised of particulates being comprised of a boron-carbon compound that has a particulate layer of titanium diboride powder on the surface of the porous body. The porous body is infiltrated with aluminum or alloy thereof resulting in the simultaneous infiltration of the $TiB_2$ layer, where the layer has an aluminum metal content that is at least about 10 percentage points greater by volume than the (ABC) composite. The ABC composite is then fused to a metal or metal-ceramic body through the infiltrated layer of titanium diboride, wherein the metal-ceramic body is a composite other than an aluminum-boron-carbon composite.

16 Claims, No Drawings

METHOD OF BONDING ALUMINUM-BORON-CARBON COMPOSITES

CROSS-REFERENCE TO RELATED APPLICATION

This application claims the benefit of U.S. Provisional Application Ser. No. 60/852,500, filed Oct. 18, 2006, which is hereby incorporated by reference.

FIELD OF THE INVENTION

This invention relates to bonding aluminum-boron-carbon (ABC) composite bodies to other bodies. In particular, the invention relates to bonding ABC composites to metal substrates.

BACKGROUND OF THE INVENTION

ABC composites are useful in many applications such as electronics, automotive applications and armor. In many of these applications, it is necessary for the ABC composite to be bonded to another substrate to realize a functioning component. Metal-ceramic composites have been described where an excess of metal is used to infiltrate a porous ceramic to form a ceramic-metal composite body that then may be bonded to another body (U.S. Pat. No. 5,011,063). Unfortunately, this method results in a sharp distinct interface, which may result in a weakened bond or a bond that has a greater chance of failure in components subjected to thermal and mechanical cycling due to the vastly differing characteristics of the metal and ABC. In addition, this method is relatively uncontrolled and a variable metal thickness may occur as well as some portion of the surface not having any metal at all.

In another method for bonding ceramic metal composite bodies, a powder layer is placed between two dense composite bodies that is infiltrated by the metal in the composite bodies followed by heating and infiltrating the layer of powder such that the two composite bodies are bonded together (U.S. Pat. No. 6,123,797). This method suffers from the problem of metal migration within the composite bodies and possible distortion of the bodies due to the high temperatures that may be necessary to cause the metal to infiltrate between the bodies and the potential that the bonding may not be adequate due to the presence of an oxide layer on the metal in the composite bodies.

Accordingly, it would be desirable to provide a method that overcomes one or more of the problems of the prior art such as one of those described above.

SUMMARY OF THE INVENTION

The invention is a method of bonding an aluminum-boron-carbon ceramic-metal composite comprising, a) forming a porous body comprised of particulates being comprised of a boron-carbon compound, b) forming a particulate layer of titanium diboride powder on a surface of the porous body, c) infiltrating the porous body with the particulate layer with aluminum or alloy thereof such that the aluminum-boron-carbon composite is formed such that the particulate layer is infiltrated with the aluminum or alloy thereof and bonded to the composite, wherein the particulate layer has an aluminum metal content that is at least about 10% percentage points greater by volume than the composite, and d) fusing the aluminum-boron-carbon composite to a metal or metal-ceramic body through the infiltrated particulate layer of titanium diboride, wherein the metal-ceramic body is a composite other than an aluminum-boron-carbon composite.

Surprisingly, the method allows for highly accurate alignment and joining of ABC composite bodies with metals and metal-ceramic composites that have, for example, substantially differing melting points and thermal expansion coefficients, which is believed to be due, for example, to the more gradual gradient structure going from the ABC composite to a metal through the aluminum infiltrated $TiB_2$ layer. The $TiB_2$ layer has a greater amount of aluminum content because, in general, it fails to react with the aluminum and the porosity of the $TiB_2$ layer may be manipulated, for example, by the particle size and particle size distribution to realize a bonding layer for the ABC composite.

The ABC composite bonded to a metal or metal-ceramic composite may be used in applications benefiting from properties such as low density and high stiffness coupled, for example, with the higher toughness of a metal. Examples of components include hard drive components (e.g., E-blocks, suspension arms, disks, bearings, actuators, clamps, spindles, base plates and housing covers); high-speed robotic components, such as robotic arms used in Si wafer manufacturing; brake and suspension components (e.g., brake pads, drums, rotors, housings, control arms, sway bars, and pistons); aerospace components (e.g., satellite mirrors, housings, control rods, propellers and fan blades); piston engine components (e.g., valves, exhaust and intake manifolds, cam followers, valve springs, fuel injection nozzles, pistons, cam shafts and cylinder liners) and other structural or recreational components (e.g., bicycle frames, robot arms, deep sea buoys, baseball bats, golf clubs, tennis rackets and arrows).

DETAILED DESCRIPTION OF THE INVENTION

In the method of the invention, a porous body is comprised of particulates that are comprised of a boron-carbon compound. Exemplary particles include those that contain compounds of boron and carbon. Examples include $B_4C$, $Al_4BC$, $Al_3B_{48}C_2$, $AlB_2$, and $AlB_{24}C_4$. Preferably, the particulates of the porous body are boron carbide particulates. The porous body may also contain other particulates such as inert fillers and metals such as described by U.S. Pat. Nos. 6,835,349; 6,296,045 and 5,011,063, but is preferred that the body is entirely comprised of particulates of boron and carbon compounds. More preferably, the entire porous body is entirely made of boron carbide particulates.

Exemplary ceramics that may be suitable as inert fillers include, for example, oxides, carbides, nitrides, silicides or combinations thereof. Examples of combinations include oxynitrides, oxycarbides and carbonitrides. Preferably, if used, the inert filler is silicon carbide, aluminum nitride, aluminum oxide or mixtures thereof.

Inert means a ceramic that essentially fails to react with the infiltrating aluminum metal, which generally coincides with less than about 5% by volume of the inert filler reacting with the metal to form a reaction product under the conditions used to form the composite. Preferably, less than 3%, more preferable less than 1% and most preferably essentially 0% by volume of the inert ceramic reacts with the metal. The inert ceramic essentially failing to react with the metal, generally, coincides with the ABC composite containing less than about 2% by volume of a metal-inert ceramic reaction product. The amount of metal-inert ceramic reaction product may be determined by a known technique such as X-ray diffraction. Preferably, the ceramic-metal composite contains at most about 0.5% by volume, more preferably at most about 0.1% by volume and most preferably essentially no metal-inert ceramic reaction product.

The powders prior to making the porous body may be mixed by any suitable method such as those known in the art. Examples of suitable methods include ball milling, attrition milling, ribbon blending, vertical screw mixing, V-blending and fluidized zone mixing. Ball milling in a solvent such as ethanol, heptane, methanol, acetone and other low molecular weight organic solvents with milling media, such as alumina and boron carbide media, generally provides satisfactory results. Other additives useful in the formation of the porous body from the mixture may be included such as dispersants, binders and solvent.

Suitable methods to form the porous body for infiltrating include, for example, shaping methods such as slip or pressure casting, pressing and plastic forming methods (e.g., jiggering, injection molding and extrusion). The forming of the porous body may include removing, if necessary, solvent and organic additives such as dispersants and binders after shaping of the mixture. Each of the above methods and steps are described in more detail in Introduction to the Principles of Ceramic Processing, J. Reed, J. Wiley and Sons, N.Y., 1988.

The porous body may be any density that is still capable of forming the ABC composite. The density generally ranges from about 40% to about 85% of theoretical density. Preferably the density of the porous body is at least about 45%, more preferably at least about 50%, most preferably at least about 60% to preferably at most about 80% and more preferably at most about 75% of theoretical density.

To the formed porous body a layer of titanium diboride powder is applied. The layer of titanium diboride may be applied by any suitable method such as those known in the art. The titanium diboride powder may be applied to one or more surface(s) of the shaped ceramic body. The $TiB_2$ powder can be contacted with the shaped ceramic body by any means which results in the formation of a layer of $TiB_2$ powder on one or more surface(s) of the shaped metal body such as thermal spraying (e.g. plasma spraying), atomized liquid spraying, dipping, spinning, brushing, rolling, padding, screening (e.g. screen printing), sol gel coating, electrostatic spraying, electrophoretic depositing, casting (e.g. tape casting) and combinations thereof. See, for example, Principles of Ceramic Processing, James Reed, 1988 or Handbook of Tribology, Materials, Coatings, and Surface Treatments, B. Bhushan and B. K. Gupta, McGraw Hill, Inc., 1991, relevant parts of each incorporated herein by reference. The layer can be a continuous layer, or a layer can be deposited in a pattern on the ceramic body. Patterns may be formed by a screen printing or a masking technique. More than one $TiB_2$ powder may be used at the same time (e.g., powders having different particle size may be blended to make a broader particle size distribution). Multiple layers of the $TiB_2$ powders may also be used to make, for example, a gradient in porosity by varying the particle size and size distribution.

Preferably, the $TiB_2$ powder is blended with a solvent into a slurry mixture in order to improve its ability to be contacted with the surface(s) of the porous body. This can be accomplished by any conventional technique, such as wet milling. The $TiB_2$ powder slurry comprises the $TiB_2$ powder, a liquid solvent and optionally one or more of a binder, plasticizer and dispersant. Preferable solvents are water, alcohols and hydrocarbons. The binder may be any binder which binds the various materials together in the slurry mixture. Preferable binders are wax, resin, gums, polyethylene, latex, acrylics, lanolin, polypropylene, polystyrene, and other thermoplastic polymers. The plasticizer may be any plasticizer which facilitates processing of the slurry mixture. Preferable plasticizers are glycols, low molecular weight polymers (e.g., liquid at room temperature), oils, fats, and soaps. The dispersant may be any dispersant which promotes dispersion of $TiB_2$ powder and other materials in the slurry mixture. Dispersants useful in this invention are nonionic dispersants such as ethoxylated nonylphenol, anionic dispersants such as magnesium stearate, cationic dispersants such as dodecylamine hydrochloride and ampholytic dispersants such as dodecyl betaine. After milling the $TiB_2$ slurry, it is heated, filtered and de-aired to remove bubbles and agglomerates. The $TiB_2$ slurry is then contacted with one or more surface(s) of the porous body.

Preferably, the $TiB_2$ powder is contacted with the shaped ceramic body using dipping, spraying or brushing. After the $TiB_2$ powder slurry previously described is atomized during the spray deposition process, it is evenly deposited on one or more surface(s) of the shaped ceramic body. Spraying involves the controlled atomization of a slurry and the directed flow of the atomized droplets onto one or more surface(s) of the shaped ceramic body. On impact with the surface(s) of the shaped ceramic body, the droplets deform and coalesce into a thick layer. The slurry is dried slowly to prevent cracking of the $TiB_2$ layer, and the drying temperature is controlled below the flash point of the chosen solvent system. The time of drying varies depending upon the solvent used and the thickness of the layer of the $TiB_2$ powder on the shaped ceramic body. It may be necessary to debinder the $TiB_2$ powder material, which can be done by any conventional debindering technique, for example, by heating under a vacuum or in an inert atmosphere.

The layer thickness generally is any thickness which is sufficient to provide a uniform layer on the surface(s) of the shaped ceramic body such that the infiltrated porous body may be fused to a metal or metal-ceramic composite body other than an ABC composite body through the infiltrated $TiB_2$ layer. The layer thickness is dependent on the amount of $TiB_2$ powder and layer porosity. The thickness of the $TiB_2$ layer, when spraying, is dependent on the spray geometry, solids content of the slurry, working distance, spraying time or sequence, rebound loss, and film flow. Spraying generally results in uniformity of the layering of the $TiB_2$ powder upon the ceramic. The preferred layer thickness is about 10 times the average $TiB_2$ particle diameter or greater, more preferably about 15 particle diameters or greater, and even more preferably about 25 particle diameters or greater. The preferred layer thickness is about 0.005 mm or greater. The preferred layer thickness is about 2 mm or less, more preferably about 1 mm or less and even more preferably about 0.5 mm or less.

The $TiB_2$ generally may be any useful particle size and particle size distribution, but desirably the $TiB_2$ has an average particle size of about 3 to about 50 micrometers by number. Preferably the average particle size by number is at least about 15, more preferably at least about 10, and most preferably at least about 3 to preferably at most about 50, more preferably at most about 25 and most preferably at most about 20 micrometers in diameter. The particle size distribution may be broad and continuous when desiring to have a highly dense layer without much porosity (e.g., less than about 25% porosity) such as when the ABC composite that is formed has a high ceramics content (e.g., greater than about 90%) to minimize the thermal expansion difference at the interface of the ABC composite and $TiB_2$ layer. The particle size distribution may also be narrow even a monomodal size distribution when desiring a high porosity $TiB_2$ layer, for example, as a layer removed from the ABC composite in a graded layer to aid in fusing the ABC body to another body such as a metal body.

Illustrative particle size distributions are ones where 90% of the particles (90 d value) by number are less than 10 times as large as the median particle size by number and 10% (10 d value) of the particles by number are less than 10 times the median particle size by number. Preferably, the particle size distribution is one where the 90 d and 10 d values are independently within 9, 8, 7, 6, 5, 4, 3, 2 times the median value.

The titanium diboride also desirably has low impurities, particularly those that may react with aluminum. For example, the metals impurities desirably is a value of at most about 5000 ppm by weight. Preferably, the amount of metal impurities is at most about 2500 ppm, more preferably at most about 1000, even more preferably at most about 500 ppm and most preferably at most about 250 ppm. It is particularly desirable to avoid free carbon, oxygen and boron in the form of boron oxide to avoid deleterious reactions with the infiltrating aluminum. Generally, the amount of free carbon is less than about 1% by weight, more preferably less than about 0.5%, even more preferably at most about 0.25% and most preferably at most about 0.1% by weight. Generally, the amount of oxygen is less than about 2%, more preferably at most about 1%, even more preferably at most about 0.5% and most preferably at most about 0.25%. The amount of boron oxide is generally less than amount as specified for oxygen.

Typically, the porosity of the $TiB_2$ layer has a porosity that is greater than the porosity of the porosity of the boron-carbon compound containing porous body, but surprisingly the $TiB_2$ layer may have a porosity that is less than the porosity of the boron carbon compound containing porous body, but upon infiltration, the amount of aluminum metal is greater in the $TiB_2$ layer as described herein. Generally, the average porosity of the $TiB_2$ layer is at least 10% more porous than the average porosity of the porous body. Preferably, the average porosity of the $TiB_2$ layer is at least 15%, more preferably at least 20%, even more preferably at least 30% and most preferably at least 40% greater than the average porosity of the porous body.

In another preferred embodiment, the $TiB_2$ layer is a gradient structure where the interface contacting the ABC composite has a metal content that is 9/10 of the metal content at the interface of the $TiB_2$ layer distal from the ABC composite (i.e., interface that contacts another body to be fused to the ABC composite). The $TiB_2$ layer interface in contact with the ABC composite has a metal content that is preferably at most 4/5, more preferably at most 3/4, even more preferably at most 1/2 and most preferably at most 1/4 of the metal content by volume of the $TiB_2$ layer to be contacted and fused with another body. Such gradients may be accomplished by putting multiple layers of $TiB_2$ with differing particle size distributions as described herein. In another preferred embodiment of making a graded structure, layers of powder having $TiB_2$ mixed with finer boron carbide are deposited on the porous body such that the first layer has a high concentration of boron carbide powder and the last layer deposited is just $TiB_2$ powder.

In another preferred embodiment, a $TiB_2$ layer having a porosity of at least 50% and preferably at least 60% is deposited on one face of the porous body. The aluminum or aluminum alloy is then infiltrated from a face of the porous body without any $TiB_2$ layer. Preferably such infiltrated face is opposite the face having the $TiB_2$ layer. The aluminum infiltrates the porous body and $TiB_2$ layer and surprisingly forms a uniform aluminum layer on the $TiB_2$ layer.

If desired, the use of screen printing could also be used to impart some geometry or texturing of the $TiB_2$ powder layer on the surface(s) of the shaped ceramic body, thus further defining the geometry of the composite body. A printing screen is utilized to impart the desired ceramic pattern upon the shaped ceramic body during screen printing and the printed image is dried. Screen printing processes are further described in greater detail in Kosloff, *Screen Printing Techniques*, Signs of the Times Publishing Co., Cincinnati, Ohio, 1981, relevant parts incorporated herein by reference.

The next step in the process involves infiltrating the porous body having a layer $TiB_2$ with aluminum or alloy thereof such that an ABC composite body is formed having a $TiB_2$-aluminum infiltrated layer bonded thereto. An alloy of aluminum means aluminum alloyed with another metal where the majority of the metal is aluminum by volume. Exemplary aluminum alloys include Al—Cu, Al—Mg, Al—Si, Al—Mn-Mg and Al—Cu—Mg—Cr—Zn. Specific examples of aluminum alloys include 6061 alloy, 7075 alloy and 1350 alloy, each available from the Aluminum Company of America, Pittsburgh, Pa.

Infiltration is the process by which a metal, upon melting, forms a solid-liquid interface with a ceramic, with the metal as the liquid and the ceramic as the solid, and the metal moves into the pores of the ceramic material by capillary action. The process preferably forms a fully dense ABC composite material. The infiltration of the aluminum or alloy thereof into the ceramic occurs through the portions of the surface(s) of the porous body on any convenient surface, but preferably, through a surface that has not been coated with a $TiB_2$ layer.

Infiltration may be performed by any method that is known in the industry, for example, U.S. Pat. Nos. 4,702,770 and 4,834,938, both incorporated herein by reference. Preferred methods of infiltration are heat infiltration, vacuum infiltration, pressure infiltration, and gravity/heat infiltration. When the infiltration is performed, the aluminum or aluminum alloy wets and permeates the pores of the porous body that is in contact with the shaped metal body.

Generally, to avoid reaction of the aluminum with the $TiB_2$, the temperature for infiltration of aluminum or alloy of aluminum into the porous body having the $TiB_2$ layer is at most about 1250° C. and more preferably from about 1200° C. or less. The temperature for infiltration of aluminum into the porous body having the $TiB_2$ layer generally should be at least about 1050° C. to ensure good infiltration of the $TiB_2$ layer and preferably at least about 1100° C.

The temperature and time of infiltration may be established by contact angle measurements to determine when wetting conditions are achieved. Infiltration time is dependent on several factors, such as packing density, pore radius, void ratio, contact angle, viscosity, surface tension and sample size. Infiltration is preferably performed until the porous body is infiltrated to form a substantially dense ABC composite. Preferably, the infiltration time is about 0.1 hour or greater, more preferably about 0.5 hour or greater, and even more preferably about 1 hour or greater. Preferably, the infiltration time is about 24 hours or less, more preferably about 12 hours or less, and even more preferably about 6 hours or less.

Infiltration may be accomplished at atmospheric pressure, subatmospheric pressure or superatmospheric pressure. The infiltration is preferably performed in an inert gas, such as argon or nitrogen, or under vacuum. At superatmospheric pressure, the infiltration temperature may be lowered. Infiltration is preferably performed until the ABC composite that is formed has density of at least about 85 percent theoretical density, more preferably greater than about 98 percent theoretical density, and most preferably greater than 99.5 percent theoretical density. Upon completion of the infiltration step, a fully infiltrated, ABC composite having an infiltrated TiB$_2$ layer is formed.

Generally, the amount of metal (aluminum or alloy thereof) in the ABC composite is at most about 25% by volume of the ABC composite. Preferably the amount of metal is at most about 10%, more preferably at most about 5%, even more preferably at most about 4% and most preferably at most about 3% to preferably at least about 0.2%.

The infiltrated TiB$_2$ layer, on the other hand, has a metal content that is at least 10 percentage points greater by volume than the ABC composite. Thus, if the ABC composite has a metal content of 1%, the infiltrated TiB$_2$ layer would have at least 11% aluminum or alloy thereof by volume in the layer. Generally, the amount of aluminum or alloy thereof in the TiB$_2$ layer is from about 11% to about 70% of the layer. Preferably the amount of aluminum or alloy thereof in the TiB$_2$ layer is at least about 20, more preferably at least about 30, even more preferably at least about 35 and most preferably at least about 40 percentage points greater by volume of the layer.

Prior to or after fusing to a metal or another ceramic-metal composite, the ABC composite with the infiltrated TiB$_2$ layer, may be further heat treated to tailor mechanical properties of the ABC composite such as described in U.S. Pat. No. 6,200,526.

Illustratively, the ABC composite is generally heated to at least about 660° C. or, more preferably at least about 700° C. and even more preferably at least about 800° C. Preferably, the heat treatment is accomplished at a temperature of about 1500° C. or less, more preferably at about 1200° C. or less and even more preferably about 1000° C. or less. The preferable time period for the heat treatment is from about 1 hour or greater, more preferably about 25 hours or greater. The heat treatment may be performed in air or an inert atmosphere such as nitrogen or argon. Preferably, the heat treatment is performed in air.

In a last step, the ABC composite with the infiltrated TiB$_2$ layer is fused to a metal body or metal-ceramic body through the infiltrated TiB$_2$ layer. The fusing may be done by methods used to fuse aluminum metal to other bodies. In fusing the ABC composite to another body the other body is contacted with the infiltrated TiB$_2$ layer and fused by a method that includes welding, soldering and brazing techniques or by simply contacting the ABC composite with a metal or metal-ceramic body other than another ABC composite and heating until the aluminum melts and creates metal bonds with the contacting body under gravitational forces or under applied pressure.

Preferably, the fusing method is a welding technique such as resistance, diffusion, ultrasonic, air-fuel flame, oxyacetylene, arc, electron beam and laser welding. Preferably the welding technique is resistance, diffusion or ultrasonic welding. Most preferably, the technique is ultrasonic welding. When welding, it is preferred to heat the ABC composite body and contacting other body to a temperature below where the aluminum or aluminum alloy melts to aid in the fusing and to minimize possible thermal shock during welding.

The particular parameters for fusing the ABC composite through the TiB$_2$ layer is dependent upon the particular body to be bonded and is determinable by one of ordinary skill in the art without undue experimentation. Illustratively, when bonding the ABC composite to aluminum by heating the ABC composite body in a stacked relationship with an aluminum body, the ABC composite and aluminum body are generally heated to 550° C. to about 625° C. for a time of about several seconds to several hours. In another illustration when the body to be bonded is steel, the bodies are heated to a temperature of about 625° C. to about 750° C. for a time of about several seconds to several hours. In performing the fusing in this way, it is preferable to ensure that the surfaces are clean of contaminants and oxides as much as possible and as such it is preferred the heating take place under an inert atmosphere (e.g., noble gas) or vacuum.

The body contacting the infiltrated TiB$_2$ layer of the ABC composite may be any useful metal or metal-ceramic composite other than an ABC composite. Exemplary metals and their alloys include, ferrous metals (e.g., steels and cast iron), Al, Ni, Cu, Mg, Ti and combinations thereof. Preferred metals include iron and alloys thereof, nickel and alloys thereof and aluminum and alloys thereof. Exemplary metal-ceramic composites include WC—Co, Al—SiC, Al—Al$_2$O$_3$, and TiC—Al, with it understood that the metal of these composites may be an alloy of that metal. Preferred metal-ceramic composites include aluminum-SiC and aluminum-alumina.

Below are specific examples within the scope of the invention and comparative examples. The specific examples are for illustrative purposes only and in no way limit the invention described herein.

EXAMPLES

Example 1

B$_4$C powder (TETRABOR ESK 1500F, ESK Ceramics GMBH & Co., Kempten, Germany) was dispersed in water (pH 7 and 35% by volume solids loading) and cast on a porous Paris plaster mold to form a porous disk (body) with a density of about 58% of theoretical. The disk was allowed to partially dry on the plaster block. After being partially dried, one face (herein "top") of the disk was sprayed with TiB$_2$ powder (HCT 30F, available from General Electric Company, GE Advanced Materials Unit, Wilton, Conn.) that was dispersed in ethanol at a 30 vol % solids loading.

The TiB$_2$ powder had an average particle size of about 4 microns and the layer was about 0.3 mm thick. The TiB$_2$ powder had a free carbon content of about 0.5%, oxygen content of about 3%, and total metals impurities of about 0.5% by weight. The particle size distribution was a D90 of ~7.5 um, D10 of ~1.5 um, and D50 of ~4.5 um.

The disk with TiB$_2$ powder layer was dried in a nitrogen-purged oven for 24 hrs at 45° C. After drying the disk it was placed in contact with Al on face opposite the top face (i.e., "bottom") and heated under a vacuum of about $10^{-4}$ Torr to a temperature of 1160° C., which was maintained for 30 minutes. The amount of aluminum was 30% excess of the amount needed simply to fill the pores of the disk. Metal infiltrated the porous body, reached the TiB$_2$ powder layer and flowed through the layer producing a uniformly distributed excess of aluminum on the top surface.

The resultant ABC part had a highly reacted interior (AlB$_2$ and Al$_{3-4}$BC being the main phases). The approximate content of Al in the part was about 20% and approximate content of Al in the coating was about 60% by volume. Indentations done using a Vickers hardness indenter (100 g load) showed no delamination or interfacial separation. The TiB$_2$ layer consisted of three layers. The first layer (next to ABC composite) was rich in TiB$_2$ (~40% TiB$_2$-60% Al by volume). The second layer was a transition layer and the third layer was essentially 100% Al.

A solid block of Al was placed on the top of the ABC composite such that the Al block contacted the infiltrated TiB$_2$ layer. A load of about 200 g was placed on the top of the Al block. This stacked arrangement was then heated to about 625-650° C. and the temperature maintained for about 30 minutes. After cooling the solid block of Al was well fused to the ABC composite.

The following Claims, even though they may not explicitly depend from one another, any combination of the embodiments of any one claim combined with any one or more claims is contemplated by the invention.

What is claimed is:

1. A method of bonding an aluminum-boron-carbon ceramic-metal composite comprising,
    a) forming a porous body comprised of particulates being comprised of a boron-carbon compound,
    b) forming a particulate layer of titanium diboride powder on a surface of the porous body,
    c) infiltrating the porous body with the particulate layer with aluminum or alloy thereof such that the aluminum-boron-carbon composite is formed such that the particulate layer is infiltrated with the aluminum or alloy thereof and bonded to the composite, wherein the particulate layer has an aluminum metal content that is at least about 10 percentage points greater by volume than the composite, and
    d) fusing the aluminum-boron-carbon composite to a metal or metal-ceramic body through the infiltrated particulate layer of titanium diboride, wherein the metal-ceramic body is a composite other than an aluminum-boron-carbon composite.

2. The method of claim 1, wherein the fusing is performed by welding, brazing or combination thereof.

3. The method of claim 2, wherein the fusing is performed by ultrasonic welding.

4. The method of claim 1, wherein the metal or metal-ceramic body fused to the aluminum-boron-carbon composite is the metal.

5. The method of claim 4, wherein the metal is aluminum, aluminum alloy or ferrous metal.

6. The method of claim 5, wherein the metal is the ferrous metal.

7. The method of claim 6, wherein the ferrous metal is steel or cast iron.

8. The method of claim 1, wherein the infiltrated layer of titanium diboride has an interface with the aluminum-boron-carbon composite and an interface with the metal or metal-ceramic body, wherein the aluminum metal content of the infiltrated layer at the aluminum-boron-carbon composite interface is ¾ of the volume of the aluminum metal at the metal or metal-ceramic body interface.

9. The method of claim 1, wherein the metal content of the titanium diboride particulate infiltrated layer is at least about 20% percentage points greater by volume than the metal content of the aluminum-boron-carbon composite.

10. The method of claim 1, wherein the particulate layer of titanium diboride is formed on only a portion of the surface of the porous body.

11. The method of claim 10, where the aluminum or alloy thereof is contacted and infiltrated into the porous body through a surface without the titanium diboride layer.

12. The method of claim 1, wherein the titanium diboride powder has a free carbon content of at most about 1% by weight.

13. The method of claim 12, wherein the titanium diboride powder has a total metals impurities of at most about 0.5% by weight.

14. The method of claim 13, wherein the titanium diboride powder has an oxygen content of at most about 1% by weight.

15. The method of claim 1 wherein infiltrating is performed by contacting the porous body with a solid aluminum or alloy thereof on a surface of the porous body and heating to a temperature of 1000° C. to 1200° C. under an inert atmosphere or vacuum.

16. The method of claim 15, wherein the surface of the porous body contacted by the solid aluminum or alloy thereof is a surface without the titanium diboride particulate layer.

* * * * *